(12) United States Patent
Mei et al.

(10) Patent No.: US 8,489,589 B2
(45) Date of Patent: Jul. 16, 2013

(54) VISUAL SEARCH RERANKING

(75) Inventors: Tao Mei, Beijing (CN); Xian-Sheng Hua, Beijing (CN); Shipeng Li, Palo Alto, CA (US); Yuan Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 333 days.

(21) Appl. No.: 12/701,283

(22) Filed: Feb. 5, 2010

(65) Prior Publication Data

US 2011/0196859 A1    Aug. 11, 2011

(51) Int. Cl.
*G06F 7/00* (2006.01)
*G06F 17/30* (2006.01)

(52) U.S. Cl.
USPC .......................................................... 707/728

(58) Field of Classification Search
USPC .................................................. 707/723, 728
See application file for complete search history.

(56) References Cited

U.S. PATENT DOCUMENTS

| | | | |
|---|---|---|---|
| 7,451,136 B2 | 11/2008 | Chua et al. | |
| 7,818,314 B2 * | 10/2010 | Chowdhury et al. | 707/722 |
| 7,885,466 B2 * | 2/2011 | Perronnin | 382/224 |
| 2003/0041054 A1 | 2/2003 | Mao et al. | |
| 2005/0223031 A1 | 10/2005 | Zisserman et al. | |
| 2009/0074306 A1 * | 3/2009 | Liu et al. | 382/229 |
| 2009/0292685 A1 | 11/2009 | Liu et al. | |
| 2009/0319883 A1 | 12/2009 | Mei et al. | |
| 2010/0125568 A1 * | 5/2010 | van Zwol et al. | 707/722 |
| 2010/0131499 A1 * | 5/2010 | van Leuken et al. | 707/723 |

OTHER PUBLICATIONS

Yuan et al., Discovery of Collection Patterns: from Visual Words to Visual Phrases, IEEE, published 2007.*
Zhang et al., Descriptive Visual Words and Visual Phrases for Image Applications, pp. 75-84, published Oct. 2009.*
Liu et al., CrowdReranking: exploring Multiple Search Engines for Visual Search Reranking, SIGIR 2009, Jul. 2009, pp. 500-507.*
Hsu et al., Video Search Reranking through Random Walk over Document-level Context Graph, MM 2007, Sep. 2007.*
Hsu et al., Reranking Methods for Visual Search, Advances in Multimedia Computing, published 2007.*
Hsiao, et al., "A Novel Language-Model-Based Approach for Image Object Mining and Re-Ranking", IEEE Computer Society, In the Proceedings of the 2008 Eighth IEEE International Conference on Data Mining, 2008, pp. 243-252.
Luo, et al., "A World Wide Web Based Image Search Engine Using Text and Image Content Features", In the Proceedings of IS&T/SPIE Electronic Imaging 2003, Internet Imaging IV, vol. 5018, 2003, pp. 123-130.
Natsev, et al., "Semantic Concept-Based Query Expansion and Reranking for Multimedia Retrieval", ACM, In the Proceedings of the 15th International Conference on Multimedia, Session: Content 6—Video Search, 2007, pp. 991-1000.

* cited by examiner

*Primary Examiner* — Jeffrey A Burke
(74) *Attorney, Agent, or Firm* — Lee & Hayes, PLLC

(57) ABSTRACT

An initial ranked list of a first plurality of visual documents is obtained from a first source in response to a query, and a second plurality of visual documents relevant to the query is gathered from a plurality of second sources. Visual patterns identified from the second plurality of visual documents are compared with the first visual documents for reranking the first visual documents.

20 Claims, 13 Drawing Sheets

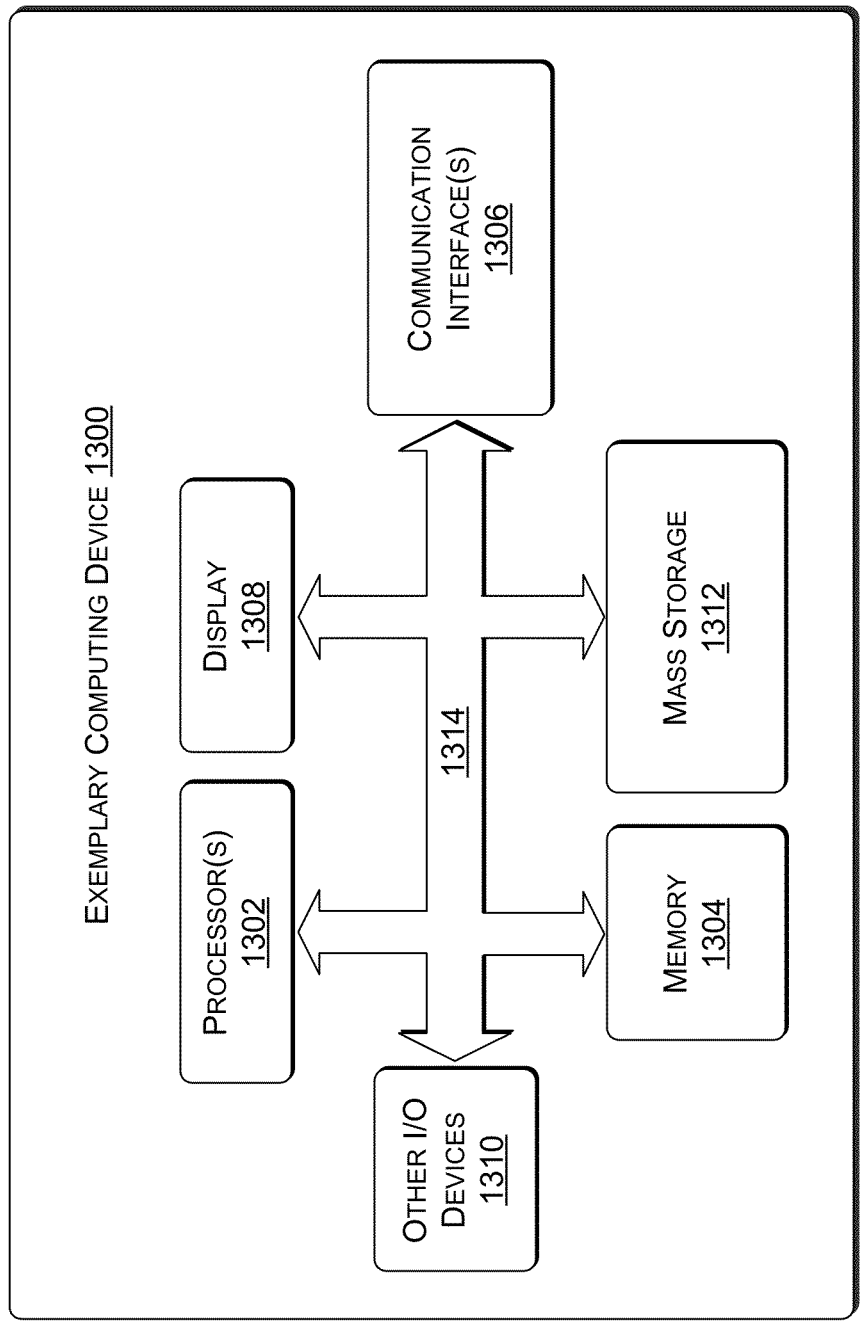

VISUAL SEARCH RERANKING

BACKGROUND

Searching for visual content has become more common as digital images, video recordings, and the like have become ever more widespread due, at least in part, to the propagation of numerous types of inexpensive digital imaging and recording devices, and the extensive availability of the resulting visual content on the Internet. Further, for example, the growth and accessibility of community-contributed media content on the Internet has led to a surge in the use of visual searching tools for locating desired image or video content. However, due to the great success of text-based searching tools, most popular image and video search engines, such as those provided by Google®, Yahoo!®, and Bing™, are built on text-based searching techniques, such as by relying on text associated with visual content for returning results in response to a visual search query. This approach to searching for visual content has proven unsatisfying, as it often entirely ignores the visual content itself as a ranking indicator in determining the most relevant results.

To address this problem, the subject of visual search result reranking has received increasing attention in recent years. Search reranking can be defined as the reordering of the located visual documents based on multimodal cues to improve the relevancy of the search results. For example, the results being reordered might be image files, video recordings, keyframes, or the like returned in response to a search query in an initial ranked order. Conventional research on visual search reranking has tended to proceed along two main directions: (1) self-reranking which only uses the initial search results for reranking of the results; and (2) query-example-based reranking which leverages user-provided query examples and results for reranking of the results.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide for reranking of visual ranked visual content by obtaining additional visual content from one or more external sources, and reranking the ranked visual content based on an analysis of the additional visual content obtained from the one or more external sources in comparison with the ranked visual content.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIG. 13 illustrates an exemplary computing device according to some implementations.

DETAILED DESCRIPTION

Visual Search Reranking

Some implementations herein provide for reranking of visual search results by obtaining external visual search results from external sources, and using those external results for determining a reranking of the visual search results. Additionally, some implementations carry out mining of relevant visual patterns from visual search results obtained from multiple search engines, visual databases, or other external visual content sources available on the Internet. For example, because different search engines and databases typically use different data sources and meta-data for indexing, as well as different searching and filtering methods for ranking, some implementations herein are based on a premise that different results may be obtained from each external source, and yet certain common visual patterns relevant to a given query will exist among those results. Thus, while a single search engine does not always have enough cues for accurately reranking results to place the most relevant results at the highest ranked positions, implementations herein assume that across the search results obtained from multiple external sources, there are common visual patterns relevant to a given query. For example, repetition of certain visual features in a large fraction of a plurality of visual documents in a set of results serves as an indicator that can be used to infer one or more common visual patterns throughout multiple sets of results.

Figure 1:
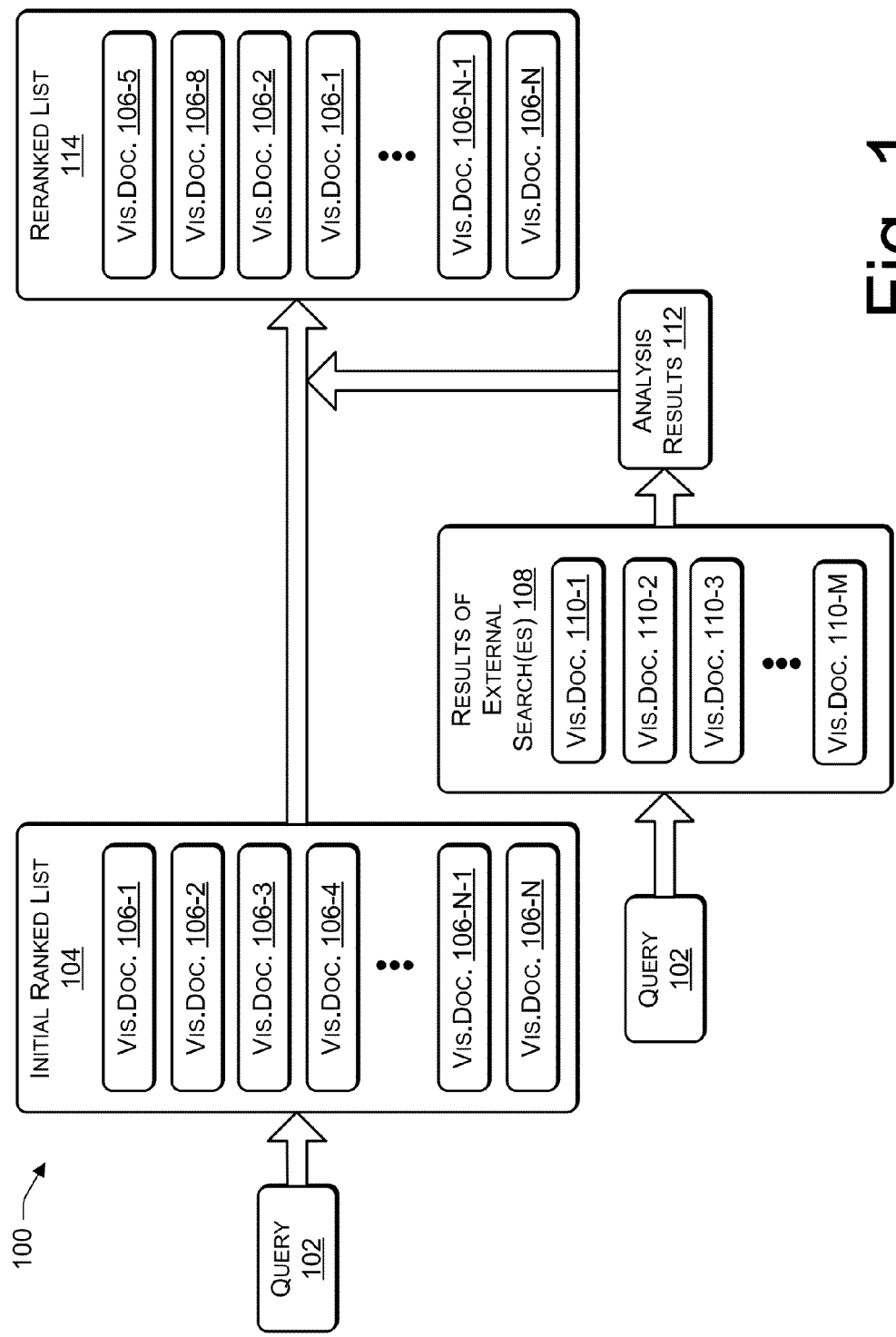
FIG. 1 depicts an exemplary block diagram illustrating visual search reranking according to some implementations disclosed herein.

According to some implementations herein, as illustrated in the block diagram 100 of FIG. 1, a query 102 is received and results in an initial ranked list 104 of visual content, which can be in the form of a list of visual documents. As referred to herein, visual documents can include images, videos, animated content, three-dimensional content, or other visual content, which may be either stand-alone visual content or part of a larger document or group of documents, or the like. Thus, it is to be understood that implementations herein are not limited to still images, and may include any form of visual content.

In the example illustrated in FIG. 1, list 104 includes a plurality of visual documents 106-1 through 106-N which have been determined to be relevant to the query 102. Query 102 is also used to obtain visual content results of one or more external searches 108 that include a plurality of additional visual documents 110-1 through 110-M. As discussed above, external searches may be conducted on multiple third party search engines, visual content databases, or other external visual content sources available on the Internet or from other resources. For example, there are a number of search engines (e.g., Google®, Yahoo!®, and Bing™) and social media sites or other sites with visual content databases (e.g., Flickr®, Wikipedia®, etc.) available on the Internet supporting different kinds of visual search abilities to provide a rich crowd-sourcing knowledge base that can be used for reranking of visual search results. The results of the external searches 108 may be analyzed to recognize common visual patterns in the visual documents 110 for producing analysis results 112. The analysis results 112 are compared with the visual documents 106 in the initial ranked list 104 for reordering the initial ranked list 104 to obtain a reranked list 114 having a plurality of reranked visual documents 106.

Figure 2:
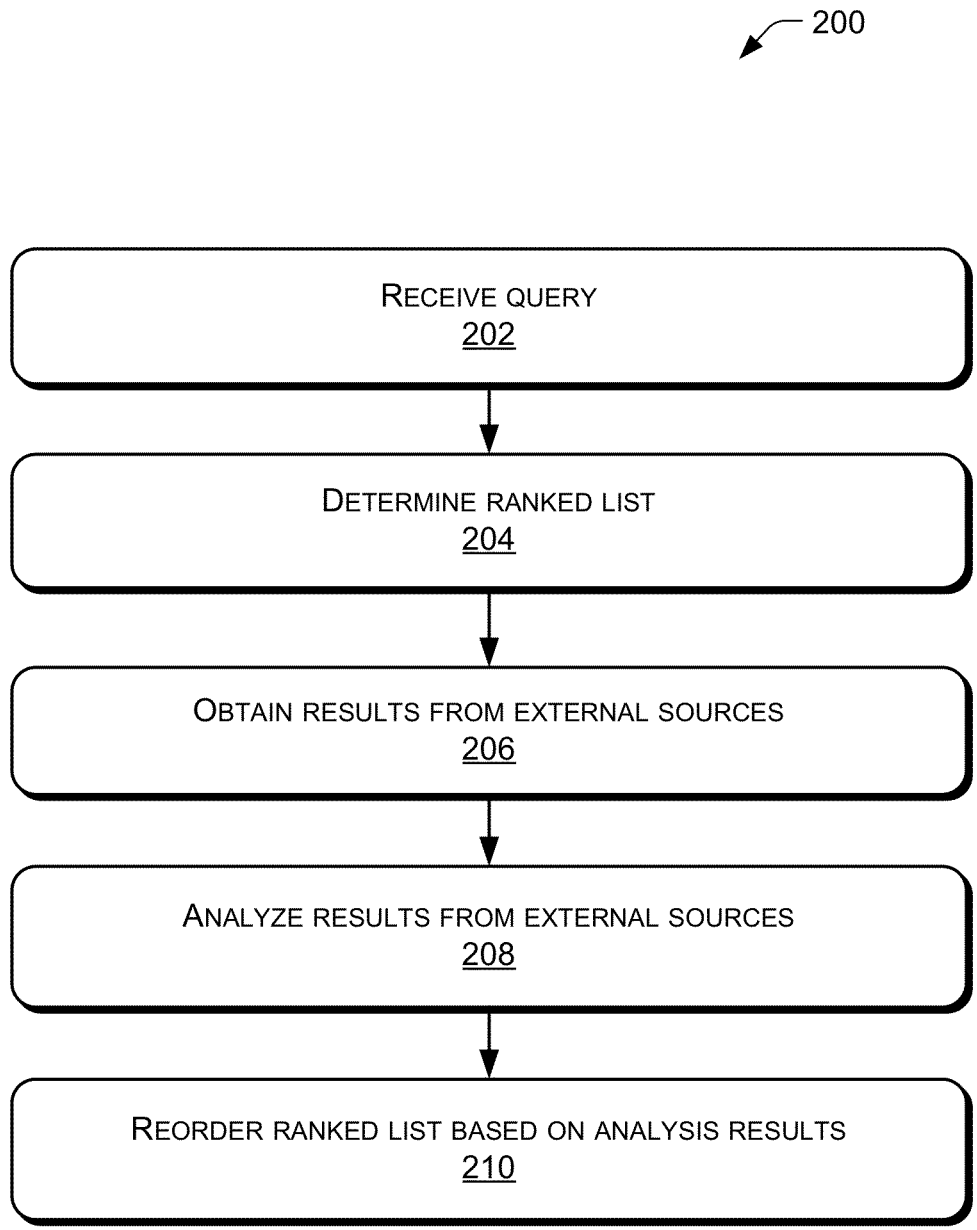
FIG. 2 illustrates a flow chart of an exemplary process for visual search reranking according to some implementations.

FIG. 2 illustrates a flowchart of an exemplary process 200 corresponding to the implementation of FIG. 1. As will be described below, the process 200 may be carried out by a processor of a computing device, such as a server, executing computer program code stored as computer-readable instructions on a computer-readable storage media or the like.

At block 202, a query for a visual search is received for obtaining visual content relevant to the query.

At block 204, an initial ranked list of relevant visual content is determined based upon the query.

At block 206, the query is used to obtain additional results from one or more external sources such as search engines, databases having visual content, or the like.

At block 208, results from the external sources are analyzed to identify common or recurring visual patterns in the results.

At block 210, based upon the recurring visual patterns determined by analysis of the results from the external sources, the initial ranked list is reordered to obtain a reranked list of results relevant to the query. Typically, for example, a user submitting a query might be interested in only reviewing the top k number of results in the ranked list (e.g., the first 5-10 highest ranked results), rather than sifting through possibly hundreds or thousands of results. Experimental evaluations have shown that the reranked list produced using implementations herein tends to contain visual content that is more relevant to the query ranked higher in the reranked list than that obtained in the initial ranked list prior to reranking.

In some implementations, the reranking is accomplished by analyzing and recognizing patterns in the external search results. For example, because local features can be effective for visual recognition in a large-scale image set, a set of visual words can be initially constructed based on local feature image patches collected from the visual documents obtained from the multiple external sources. Two types of visual patterns can be detected among the visual words, namely, salient patterns and concurrent patterns. The salient pattern indicates the importance of each visual word, while the concurrent pattern expresses the interdependent relations among the visual words. The concurrent pattern (which is sometimes also referred to as "context") is known to be informative for vision applications. Intuitively, if a particular visual word has high importance for a given query, then other words co-occurring with that particular visual word should also be prioritized. Therefore, implementations herein adopt a graph propagation method by treating visual words as pages (nodes) and their concurrence as hyperlinks (edges). The stationary probabilities can be represented as the salient pattern, while the concurrent pattern can be estimated based on the propagation of the weights of edges in the graph data structure. The reranking can then be approached as an optimization problem that partially preserves the ranking of the initial ranked list and that simultaneously matches the reranked list with the learned visual patterns as much as possible. Thus, from the foregoing, and as will be described additionally below, implementations herein are able to provide for reranking of visual search results for improving relevance.

Exemplary System

Figure 3:
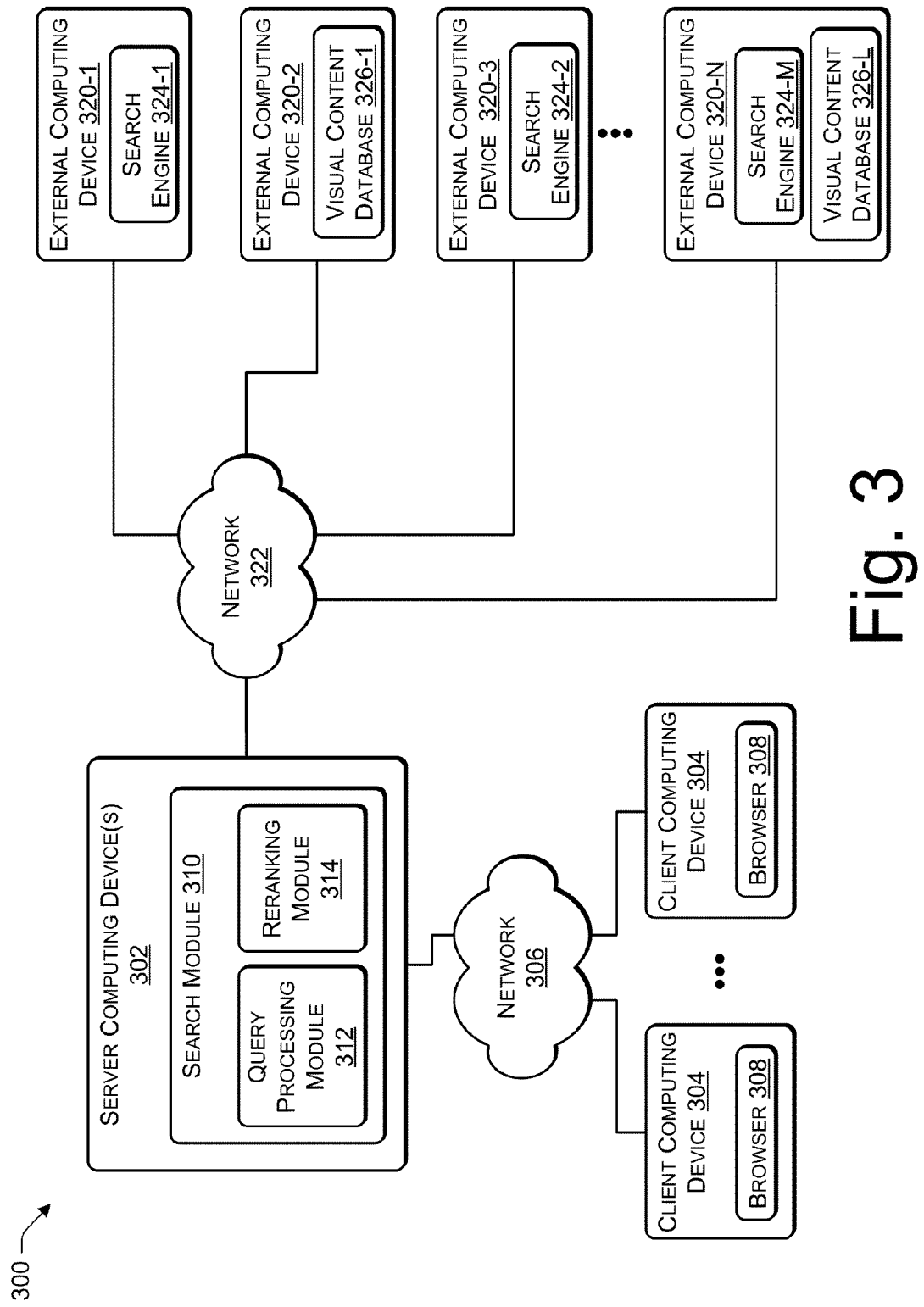
FIG. 3 illustrates a block diagram of an exemplary system according to some implementations.

FIG. 3 illustrates an example of a system 300 for carrying out visual search reranking according to some implementations herein. To this end, the system 300 includes one or more server computing device(s) 302 in communication with a plurality of client or user computing devices 304 through a network 306 or other communication link. In some implementations, server computing device 302 exists as a part of a data center, server farm, or the like, and is able to serve as a commercial search website. The system 300 can include any number of the server computing devices 302 in communication with any number of client computing devices 304. For example, in one implementation, network 306 includes the World Wide Web implemented on the Internet, including numerous databases, servers, personal computers (PCs), workstations, terminals, mobile devices and other computing devices spread throughout the world and able to communicate with one another. Alternatively, in another possible implementation, the network 306 can include just a single server computing device 302 in communication with one or more client devices 304 via a LAN (local area network) or a WAN (wide area network). Thus, the client computing devices 304 can be coupled to the server computing device 302 in various combinations through a wired and/or wireless network 306, including a LAN, WAN, or any other networking technology known in the art using one or more protocols, for example, a transmission control protocol running over Internet protocol (TCP/IP), or other suitable protocols.

In some implementations, client computing devices 304 are personal computers, workstations, terminals, mobile computing devices, PDAs (personal digital assistants), cell phones, smartphones, laptops or other computing devices having data processing capability. Furthermore, client computing devices 304 may include a browser 308 for communicating with server computing device 302, such as for submitting a search query, as is known in the art. Browser 308 may be any suitable type of web browser such as Internet Explorer®, Firefox®, Chrome®, Safari®, or other type of software that enables submission of a query for a visual search.

Furthermore, server computing device 302 may include a search module 310 for responding to search queries received from client computing devices 304. Accordingly, search module 310 may include a query processing module 312 and a reranking module 314 according to implementations herein, for providing ranked search results in response to visual search queries, regular text queries, and the like.

Server computing device 302 is also able to communicate with a plurality of external computing devices 320-1 through 320-N via a network 322. Network 322 may be the same network as network 306, or may be a separate network from network 306. For example, network 322 may be the Internet or other network providing access to external computing devices 320, while network 306 may also be the Internet, or maybe a LAN, Private WAN, or the like, as discussed above. Each external computing device 320 may include at least one of a search engine 324-1 through 324-M, a visual content database 326-1 through 326-L, or other searchable visual content. As discussed above, examples of search engines 324 include Google®, Yahoo!®, and Bing™, while examples of databases 326 having visual content include Flickr® and Wikipedia®. Thus, it may be seen that server computing device 302 is able to submit queries to external computing devices 320 for obtaining search results from the external computing devices 320. Furthermore, while a particular exemplary system architecture is illustrated in FIG. 3, it should be understood that other suitable architectures may also be used, and that implementations herein are not limited to any particular architecture. For example, in other implementations, query processing module and reranking module 314 may be located in client computing devices 304 as part of browser 308, in which case server computing device 302 is not required. In such an implementation, client computing device 304 can obtain the initial ranked list from one of the external computing devices 320, and obtain the external search results from others of the external computing devices 320. Other variations will also be apparent in light of the disclosure herein.

Crowd-Based Reranking

Some implementations for visual search reranking disclosed herein mine certain common or recurring visual patterns which are relevant to a given query from the search results received from multiple search engines or other external sources. These mined visual patterns can be used to obtain an optimal reranked list of search results that match most closely with the mined visual patterns. Thus, by leveraging data collected from a plurality of different sources (i.e., a crowd of sources) superior results can be achieved in comparison to results obtained from a single source.

Figure 4:
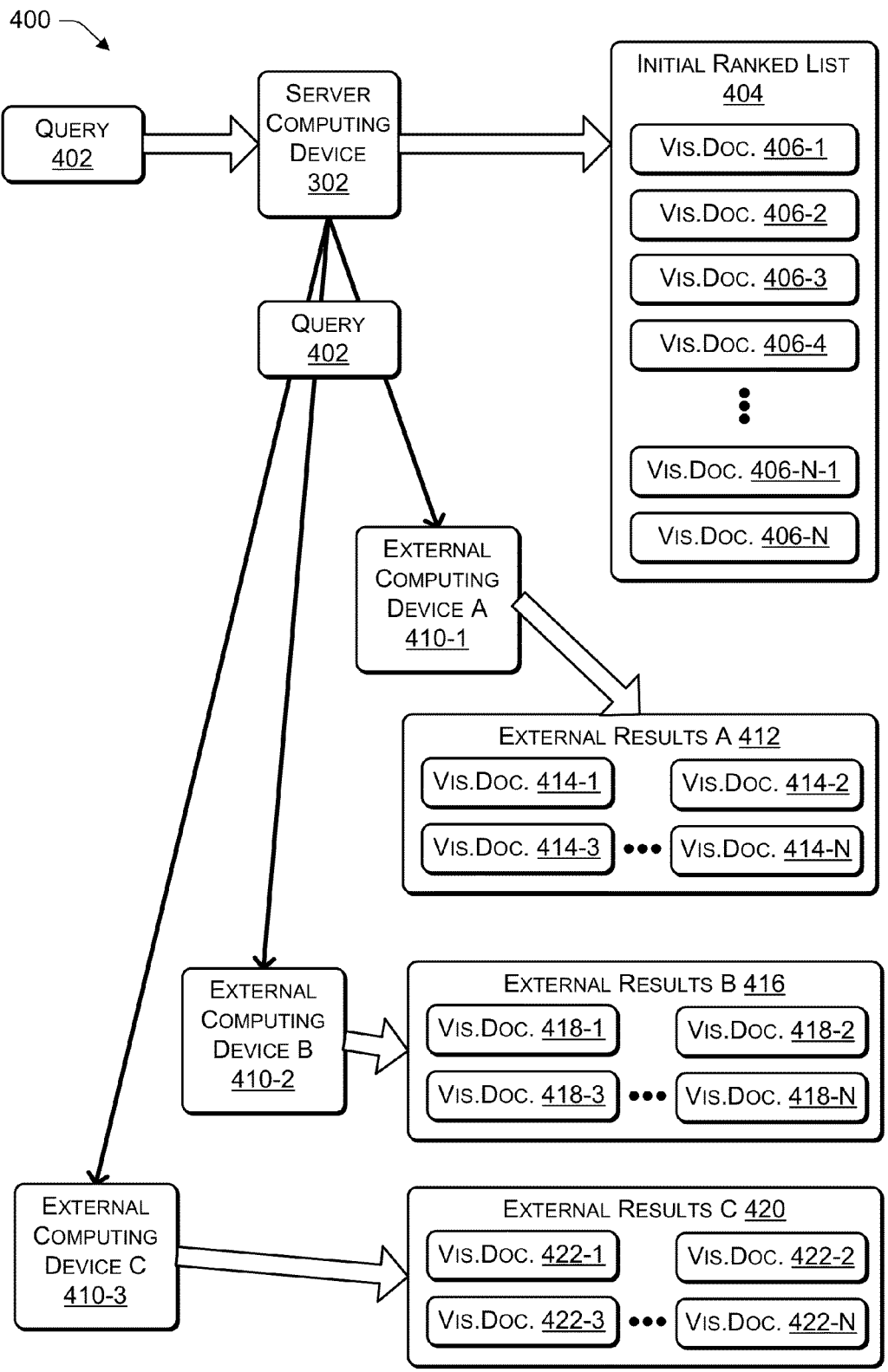
FIG. 4 illustrates an exemplary block diagram of obtaining external search results according to some implementations.

FIG. 4 illustrates a block diagram 400 depicting initial stages of some implementations herein. In the illustrated example, building on the example of FIG. 3, a query 402 is submitted to server computing device 302 as a textual query for which visual content is sought. For example, query 402 may be submitted by one of client computing devices 304. In response to receiving the query 402, server computing device 302 obtains an initial ranked list 404 of visual documents (e.g., images, video recordings, etc.), such as through the use of conventional text-image search techniques that may be based on collecting images associated with indexed text or video transcripts. The initial ranked list 404 includes a plurality of corresponding visual documents 406-1 through 406-N that represent the results. For example, server computing device 302 may include its own search engine for providing ranked lists of visual content results in response to received queries, or alternatively, server computing device 302 may obtain the initial ranked list 404 from another computing device, such as another server in the same data center as server computing device 302, or from an external computing device, such as one of external computing devices 320 in communication with server computing device 302 over the network 322.

Additionally, the query 402 is also submitted to multiple image and video search engines or sites (e.g., Google®, Yahoo!®, Bing®, Flickr®, etc.) that provide image and video search engines to obtain a plurality of different ranked lists of visual search results. Thus, in the illustrated example, query 402 is submitted to external computing device A 410-1, external computing device B 410-2, and external computing device C 410-3, which may correspond to external computing devices 320 of FIG. 3. Each of these external computing devices 410 provides visual search results in response to the query 402 back to server computing device 302. For example, external computing device A 410-1 provides ranked external results A 412 comprising visual documents 414-1 through 414-N; external computing device B 410-2 provides ranked external results B 416 comprising visual documents 418-1 through 418-N; and external computing device C 410-3 provides ranked external results C 420 comprising visual documents 422-1 through 422-N. Furthermore, while external results from three external computing devices 410 are shown in the illustrated example, it should be understood that implementations herein are not limited to any particular number of external computing devices.

As will be described additionally below, after the external results 412, 416, 420 have been obtained the external results are analyzed to identify recurring visual patterns in the higher ranked portions of the external results. In some implementations, the external results are examined to identify a set of representative visual words by clustering local features of image patches which are collected from the external search results from the multiple external sources. These visual words can then be used to construct a graph data structure in which the visual words are nodes of the graph and the edges between the nodes are weighted according to the concurrent relations between the visual words. Through a propagation process which takes the initial rankings in the initial ranked list and the reliability of search engines and other external sources into account, relevant visual patterns can be detected, including salient and concurrent patterns, and applied for carrying out the reranking. Thus, the reranking of the initial ranked list can then be formalized as an optimization problem on the basis of the mined visual patterns, as well as a Bag-of-Words (BoW) representation of the initial ranked list. This enables a closed-form solution to be achieved to this optimization problem, thereby providing a definitive reranking of the initial ranked list.

For example, given a document set X with N documents to be reranked, where $X=\{x_1, x_2, \ldots, x_N\}$, then $\bar{r}_i$ can denote the initial ranking score (i.e., relevance) and $r_i$ can denote the reranking score for a particular document $x_i$. In some implementations, the initial ranking scores (i.e., the rankings in the initial ranked list) are preserved since the initial ranking scores indicate relevance information from a text perspective. On the other hand, the reranked list should also be consistent with the learned knowledge (i.e., the mined visual patterns) obtained from the external sources. Therefore, the following energy function can be used to describe the reranking process:

$$E(r) = \text{Dist}(r, \bar{r}) - \lambda \text{Cons}(r, K) \tag{1}$$

where $\bar{r}=[\bar{r}_1, \bar{r}_2, \ldots, \bar{r}_N]^T$ and $r=[r_1, r_2, \ldots, r_N]^T$, $\text{Dist}(r, \bar{r})$ corresponds to the ranking distance, while $\text{Cons}(r,K)$ corresponds to the consistence between the reranked list r and the learned knowledge K. K indicates the learned knowledge (i.e., the mined visual patterns) obtained from the multiple external sources. The parameter $\lambda$ tunes the contribution of knowledge K to the reranked list, by controlling the weight given to the mined visual patterns in the overall ranking determination. For example, when the parameter $\lambda=0$, the reranked list r will be the same as the initial ranked list. The parameter $\lambda$ can be set according to the performance of initial search results. Basically, a relatively larger $\lambda$ would be more suitable for worse initial search results. As one example, an optimal value for the parameter $\lambda$ can be determined empirically through an initial sampling of the accuracy of the search results obtained from the server computing device 302 in comparison with the search results obtained from the external sources. Thus, when the search results obtained from the external sources tend to be more accurate than the search results in the initial ranked list, it is desirable to have a large $\lambda$ value. Experiments based on the implementation herein have shown values for $\lambda$ between 0.1 and 5 have produced good results for several popular search engines.

Visual Pattern Mining

After the external search results have been obtained from the external sources, as described above, some implementations herein search for common or recurring visual patterns across the different ranked lists of visual documents. For example, implementations herein might examine a certain number of the most highly ranked results returned in each set of external results to detect visual patterns that they have in common, i.e., visual patterns that occur across a large number of the returned visual documents. Various different techniques may be used for detecting the common visual patterns in the returned results, several which will be described herein. For example, common visual patterns may be detected in some embodiments using a scale-invariant feature transform (SIFT) descriptor with a Difference of Gaussian (DoG) interest detector. Alternatively, in other embodiments color histograms may be used for detecting the common visual patterns. Other methods for detecting common visual patterns will also be apparent to those of skill in the art in light of the disclosure herein.

The SIFT technique is described, for example, by D. Lowe, "Object recognition with informative features and linear classification", Proceedings of IEEE International Conference on Computer Vision, 2003, and provides for detection of visual patterns based upon identified interest points. Interest points are identified based on detected differences and gradients surrounding pixels being examined, and each interest point identified in a visual document is associated with a 128-dimensional feature vector. Accordingly each visual document can be represented by a collection of vectors of the same dimension, and the order of the vectors is of no particular importance.

Alternatively, color histograms may be used for identifying features in the visual document results received from the external sources by numerically representing the distribution of colors in a visual document. Histograms can be created for a visual document by counting the number of pixels of each of a given set of color ranges in a color space, thereby providing a numerical summarization of a visual document. The color histogram of a visual document tends to be relatively invariant for translation or rotation of the visual document. Thus, by comparing histogram signatures of two visual documents and thereby matching the color content of one visual document with the other, features common to the two visual documents can be recognized.

Implementations herein use one or more of the feature-identification techniques discussed above, or other alternative techniques, to identify patches in the visual documents that represent relevant features that can be used to create "visual words". Patches that are similar to each other are clustered into visual words, and a plurality of the visual words corresponding to a visual document can be used to represent that visual document using a Bag-of-Words (BoW) representation technique in which each visual document can be represented by a bag or group of visual words that correspond to that visual document.

Figure 5:
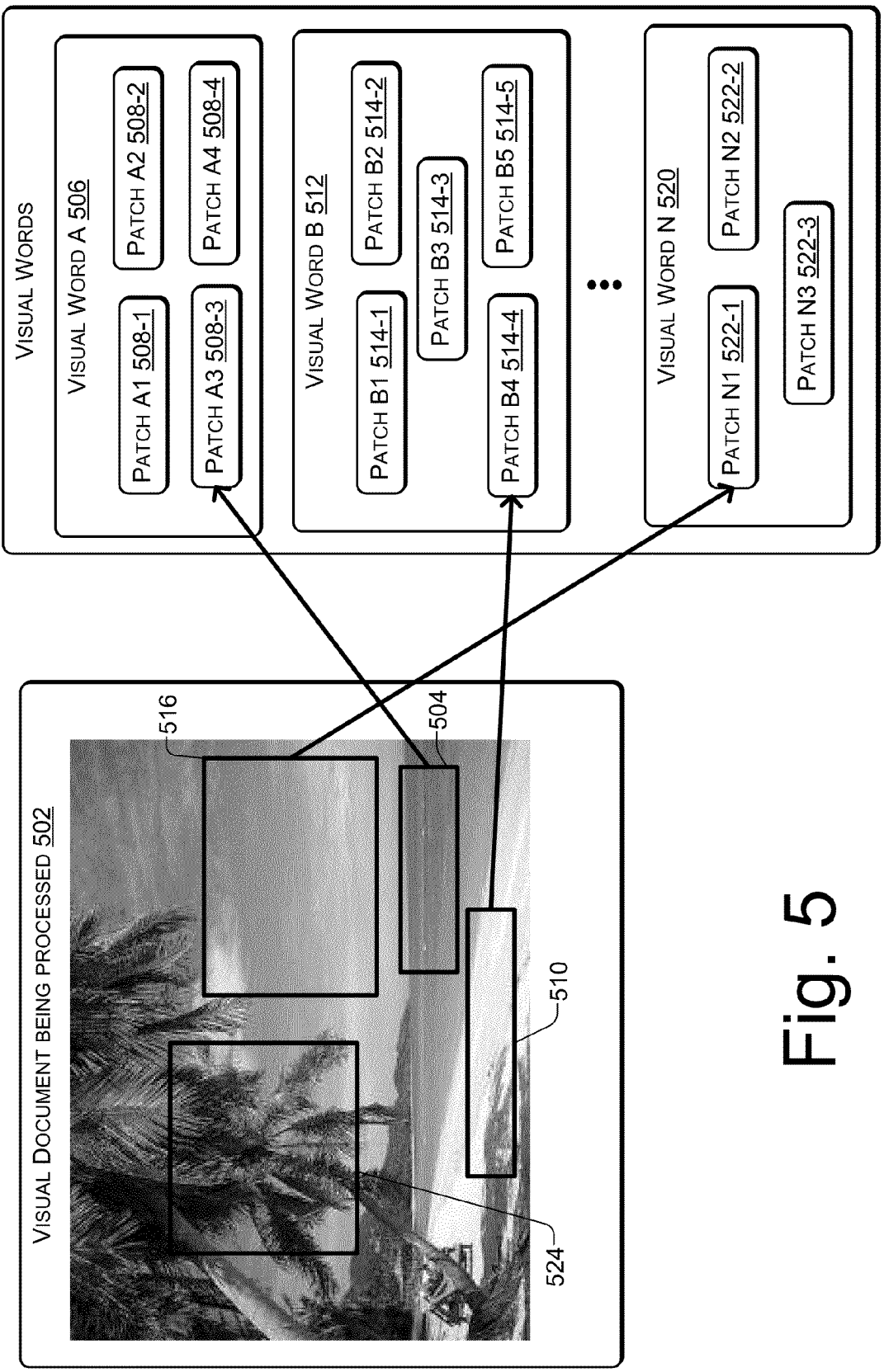
FIG. 5 illustrates an exemplary block diagram of visual word generation according to some implementations.

For example, as illustrated in FIG. 5, features identified in a visual document are used to create visual words. FIG. 5 illustrates conceptual processing of a visual document 502, which may be a visual document corresponding to external results received from an external source, such as external results A 412, external results B 416 or external results C 420 of FIG. 4. The visual document 502 is examined for visual features using one of the techniques discussed above, such as SIFT, color histograms, or the like. Patches of identified features are extracted from the visual document 502 and clustered or grouped with other similar patches of similar features extracted from other visual documents in the external results. These clusters or groups of patches may be referred to as visual words. For example, in the illustrated visual document 502 which was retrieved in response to the query "beach", various portions of the visual document are identified as visual features to be extracted. For instance, a portion 504 of visual document 502 corresponds to water or the sea. This portion 504 is extracted and grouped in visual word A 506 as a patch A3 508-3 along with other similar patches A1 508-1 through A4 508-4 extracted from portions of other visual documents that have the same or similar visual features as the portion 504 (i.e., portions of that appear as water or the sea). Similarly, portion 510 (i.e., appearing as sand) is extracted from visual document 502 and added to visual word B 512, which may contain other patches B1 514-1 through B5 514-5 that also have a similar appearance extracted from other visual documents in the results. Further, portion 516 (i.e., appearing as the sky) is extracted from visual document 502 and added to visual word N 520 which may contain other patches N1 522-1 through N3 522-3 that have a similar appearance extracted from other visual documents in the results. Additionally, portion 524 (i.e., appearing as a palm tree) may also be extracted and added to another visual word (not shown). What is more, patch A3 508-3, patch B4 514-4 and patch N1 522-1 are all connected to each other because they are extracted from the same visual document, and this connection is also used in reranking implementations herein, as is described additionally below.

Figure 6:
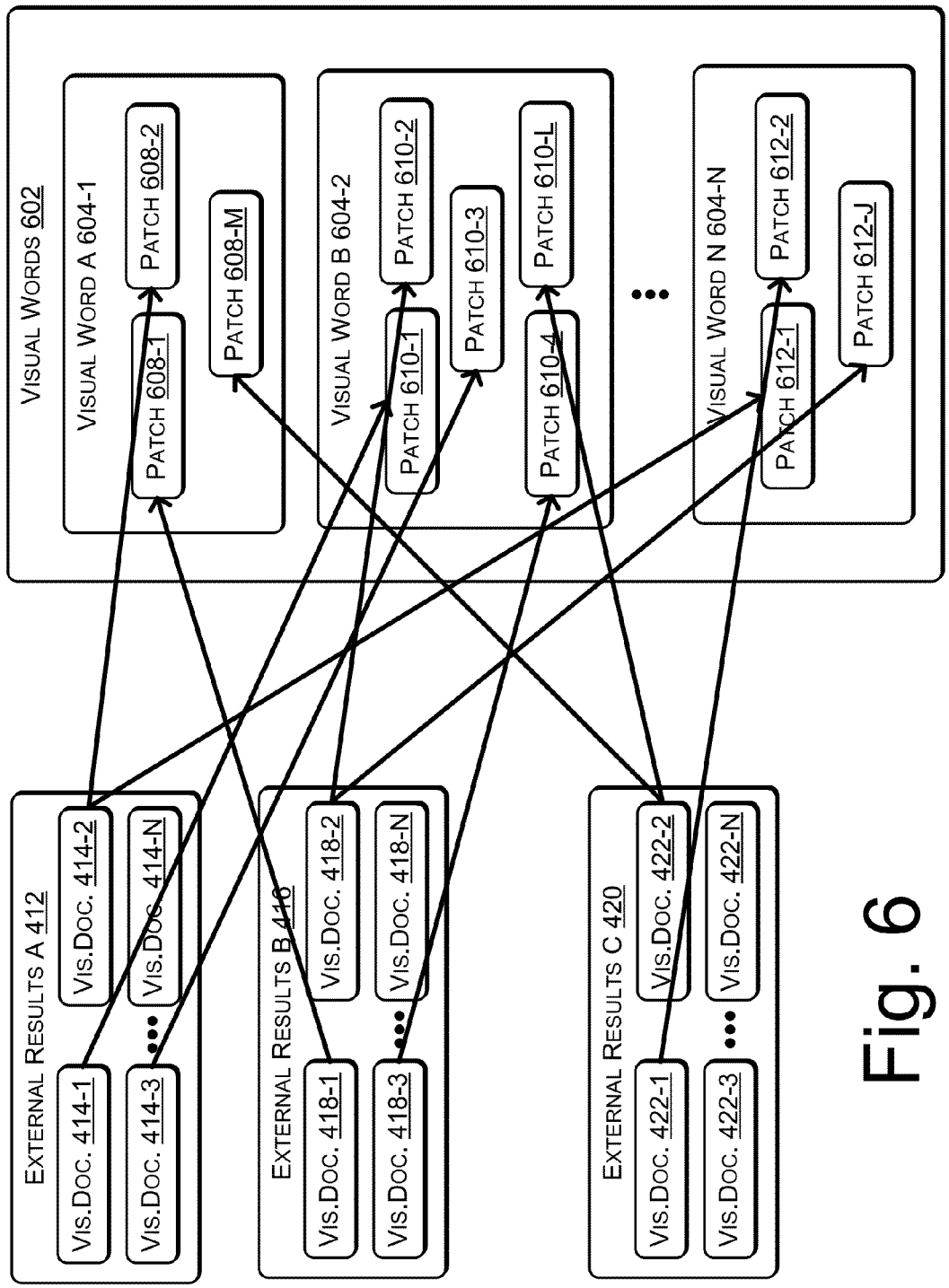
FIG. 6 illustrates an exemplary block diagram of visual word generation from multiple search results according to some implementations.

FIG. 6 illustrates a conceptual block diagram depicting a plurality of visual words 602 created from processing of multiple visual documents from the multiple external search results 412, 416, 420 obtained in response to a query, as discussed above with reference to FIG. 4. Thus, patches are extracted from the external search results 412, 416, 420, and similarly appearing patches are clustered or grouped together to create visual words A 604-1 through N 604-N. In the illustrated example, visual word A 604-1 includes a plurality of patches 608-1 through 608-M; visual word B 604-2 includes a plurality of patches 610-1 through 610-L; and visual word N includes a plurality of patches 612-1 through 612-J. As a practical matter only a certain number of visual documents in each set of external search results may be examined. For example, the top five or top ten visual documents from each set of results will tend to contain the most relevant visual documents, and thus, examining only the top results of each external search is typically sufficient.

After the visual words are created, as described above, according to some implementations, for a given query, visual patterns K can be mined from the visual words generated from the search results of the external sources by determining an importance of each visual word. Specifically, in some implementations, two kinds of visual patterns are determined: salient patterns and concurrent patterns. The salient patterns indicate the importance of each visual word to the query, while the concurrent pattern expresses the interdependent relations among the visual words. The premise of using concurrence as hyperlinks is that if a visual word is viewed as important, then other co-occurring or related visual words also might be of interest. For example, for a query "beach", visual words containing patches extracted from the sea or water portions of the visual documents would tend to be ranked high, i.e., the visual word would have a very high number of patches in it. Also, there would tend to be a high co-occurrence with visual words having patches extracted from "sand" portions of visual documents and "sky" portions of visual documents. In other words, the visual documents that have patches located in the "sea" visual word would also have patches located in the "sand" visual word and the "sky" visual word, and therefore, these visual words should also be prioritized.

Figure 7:
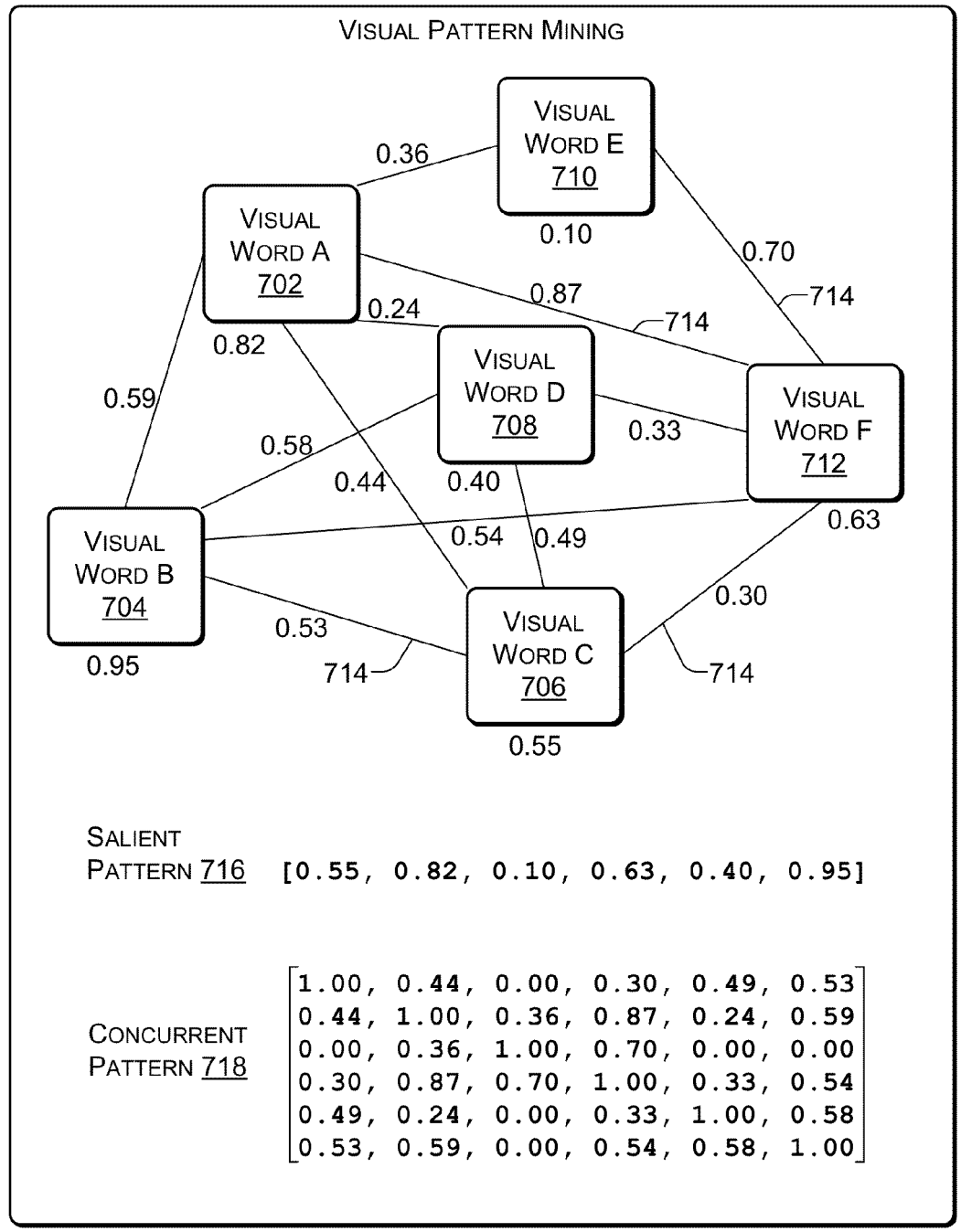
FIG. 7 illustrates visual pattern mining according to some implementations.

To accomplish this, as illustrated in FIG. 7, implementations herein adopt a propagation framework and construct a graph data structure with the visual words. In the example of FIG. 7, visual words A-E 702-712 are represented in the graph as nodes and the co-occurrence between the visual words is represented as weighted edges or hyperlinks 714, which can be used to determine a salient pattern 716 and the concurrent pattern 718. Accordingly for a set of L visual words, the visual pattern K can be expressed as the combination of the salient pattern q and the concurrent pattern C:

$$K=K(q,C) \quad (2)$$

where the salient pattern $q=[q_1, q_2, \ldots, q_L]^T$ is an L-dimensional vector with each element indicating the salience or importance of a visual word, and the concurrent pattern $C=[c_{mn}]_{(L \times L)}$ is an L×L matrix with each element indicating the hyperlink or connection value between two visual words. In the example illustrated in FIG. 7, the salient pattern 716 is represented as the salience or importance of each visual word, for example visual word C 706 has a salience value of 0.55, visual word A 702 has a salience value of 0.82, visual word E 710 has a salience value of 0.10, and so forth. Additionally, the concurrent pattern 718 is a matrix representing the connections between the visual words, as described below. For example, for visual word C 706, the connection to itself is 1.00, the connection to visual word A 702 is 0.44, the connection to visual work E, 710 is 0.00, the connection to visual word F 712 is 0.30, and so forth.

Figure 8:
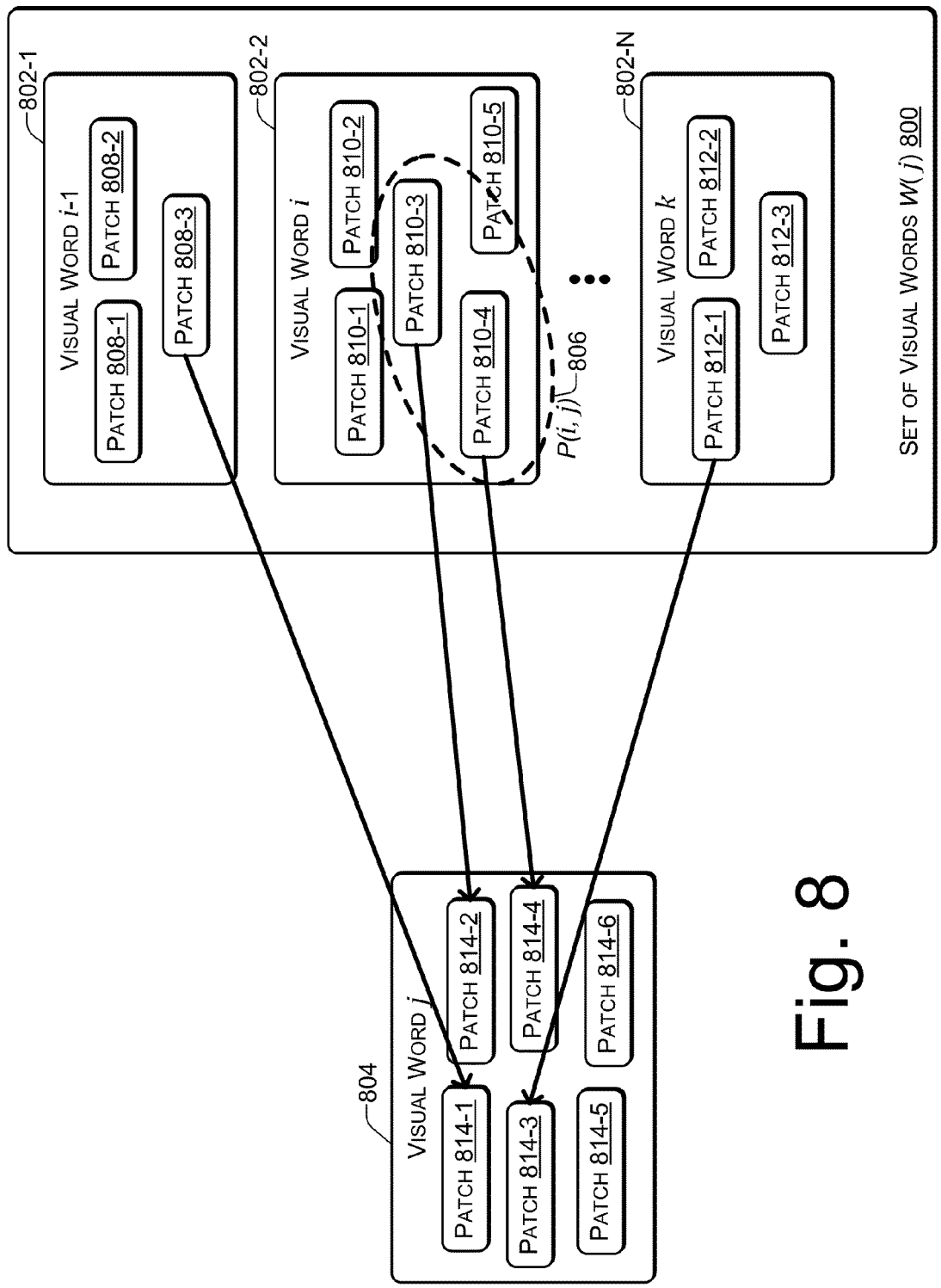
FIG. 8 illustrates connections between visual words according to some implementations.

FIG. 8 illustrates an example of determining the connections or concurrence between visual words. In the illustrated example, a set of visual words W(j) 800 denotes the set of visual words 802-1 through 802-N that contain patches connecting to the patches in visual word j 804, and the set of patches P(i, j) 806 denote the set of patches in visual word i 802-2 that connect to the patches in visual word j 804. For example, visual word i–1 802-1 includes patches 808-1 through 808-3; visual word i 802-2 includes patches 810-1 through 810-5; visual word k 802-N includes patches 812-1 through 812-3; and visual word j 804 includes patches 814-1 through 814-6. Patch 808-3 in visual word i–1 is connected to patch 814-1 in visual word j since both patches were extracted from different portions of the same visual document. Patch 810-3 is similarly connected to patch 814-2 since both of these patches were extracted from different portions of the same visual document; patch 810-4 is similarly connected to 814-4; and patch 812-1 is similarly connected to patch 814-3. Thus, there is a greater connection between visual word i 802-2 and visual word j 804 than there is between visual word j 804 and either of visual word i–1 802-1 or visual word k 802-N. Accordingly, there is higher concurrence between visual word j 804 and visual word i 802-2 and this can be reflected in the graph of FIG. 7 by giving higher weights to the edges that connect the visual words having higher concurrence.

Furthermore, for determining the values in the graph of FIG. 7, the salience and the concurrence can be determined mathematically. In particular, the salience of visual word j 804 after the k-th iteration, $q_j(k)$, is given by the formula:

$$q_j(k) = \varepsilon q_j(0) + (1 - \varepsilon) \sum_{i \in W(j)} \frac{|P(i, j)|}{\sum_{k=1}^{L} |P(i, k)|} q_i(k - 1) \quad (3)$$

where |•| denotes the size of a set, $\epsilon(0 \le \epsilon < 1)$ is the weight balancing the initial and the propagated salience scores. Further, $q_j(0) = \Sigma_l x_j^l$, $x_j^l$ denotes the normalized ranking score of the l-th patch from visual word j in the initial ranked list. Accordingly, the concurrent pattern is given by the average weight between word i and j over the graph:

$$c_{ij} = \left( \frac{|P(i, j)|}{\sum_{k=1}^{L} |P(i, k)|} + \frac{|P(j, i)|}{\sum_{k'=1}^{L} |P(i, k')|} \right) \times 0.5 \quad (4)$$

Bag of Words Representation

Figure 9:
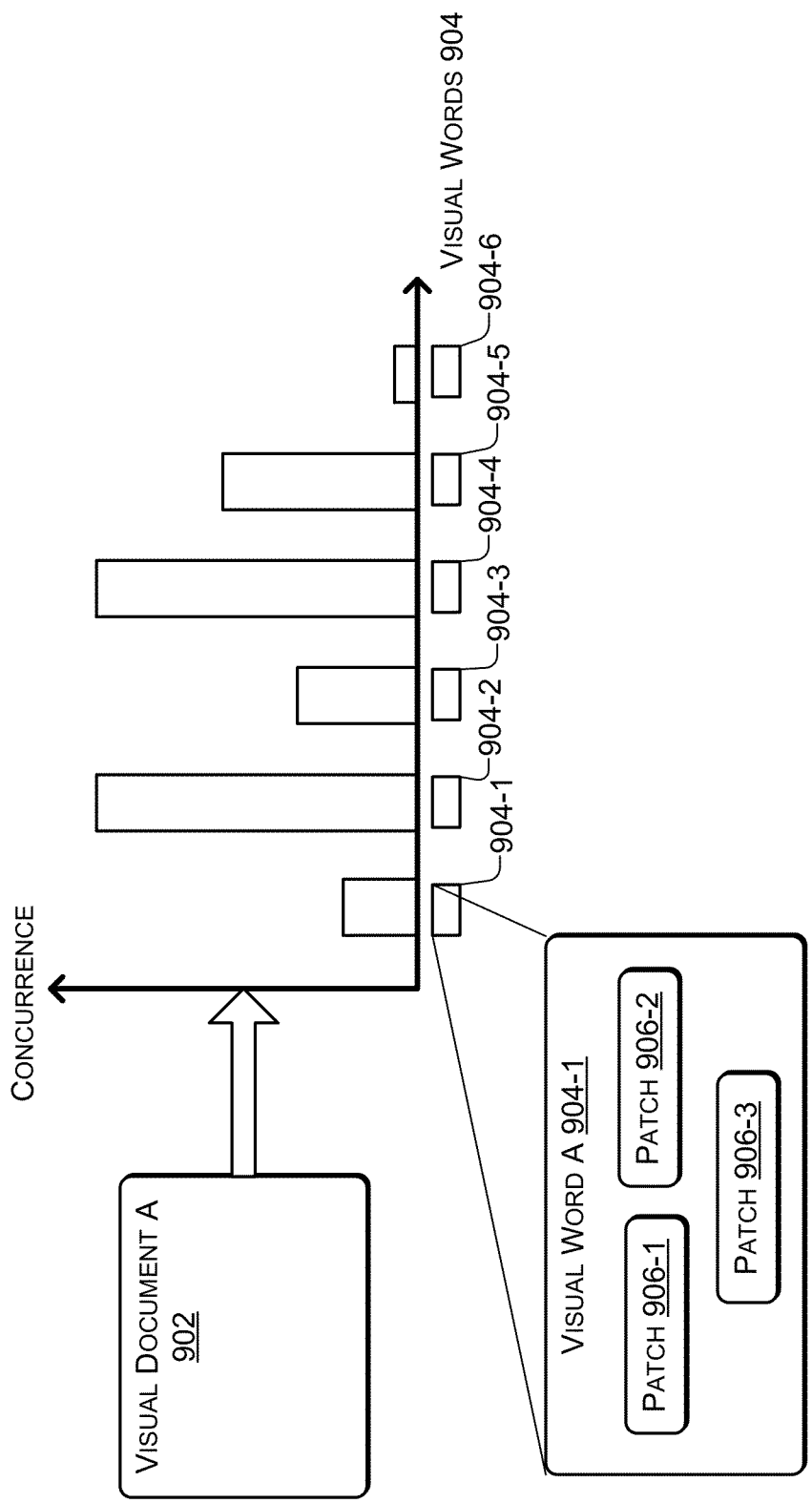
FIG. 9 illustrates bag of words representation according to some implementations.

FIG. 9 is a block diagram illustrating an example of bag of words (BoW) representation of the visual documents in the initial ranked list using the visual words extracted from the external search results. In the illustrated example, a visual document A 902 from the initial ranked list is examined for concurrence with a set of visual words 904 determined from the external search results, such as the visual word generated as described above with reference to FIGS. 5 and 6. For example, visual word A 904-1 includes a plurality of patches 906-1 through 906-3. Visual document A 902 is compared with the patches 906 in visual word A 904-1 using one or more of the feature identification methods discussed above such as SIFT or color histograms for determining whether there is a match and a corresponding concurrence value is assigned for that visual word for that visual document 902. This process is repeated for each visual word, so that the visual document 902 is represented according to its concurrency with a plurality of the visual words.

Figure 10:
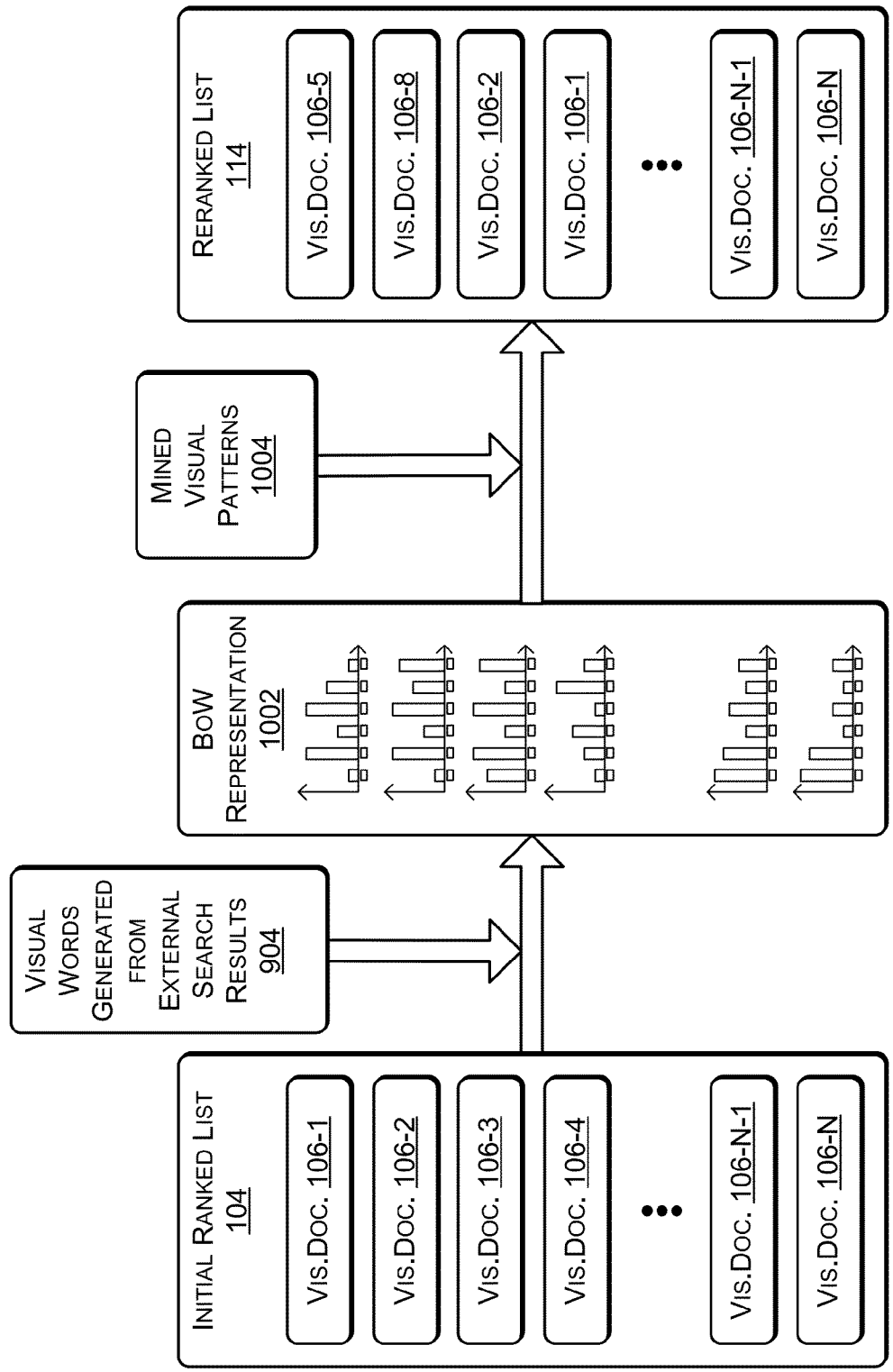
FIG. 10 depicts a block diagram illustrating reranking of an initial ranked list according to some implementations.

As illustrated by the block diagraph of FIG. 10, this process is repeated for each of the visual documents 106 in the initial ranked list 104 to create a BoW representation 1002 for each of the visual documents 106 in the initial ranked list 104. Accordingly, each visual document in the initial ranked list 104 is represented by a concurrency of a group of the visual words 1002. The BoW representation can then be used in the reranking of the visual documents 106 in the initial ranked list 104 by applying the mined visual patterns 1004 discussed above with reference to FIGS. 7 and 8 to the bag of words representation to obtain the reranked list 114. Several techniques for applying the mined visual patterns 1004 to the initial ranked list for obtaining the reranked list are described below.

Reranking

Implementations herein apply a ranking distance Dist(r, r̄) and a consistency Cons(r, K) based on the mined knowledge K(q, C). Implementations herein may apply one or both of a pointwise distance calculation and a pairwise distance calculation. The pointwise ranking distance is applied by the following equation:

$$\text{Dist}(r, \bar{r}) = \Sigma_n (r_n - \bar{r}_n)^2 \quad (5)$$

and pairwise ranking distance is applied by the following equation:

$$\text{Dist}(r, \bar{r}) = \sum_{m,n} \left( 1 - \frac{r_m - r_n}{\bar{r}_m - \bar{r}_n} \right)^2 \quad (6)$$

Implementations herein leverage the mined visual pattern K to define a visual consistency. For example, if $f_n=[f_{n1}, f_{n2}, \ldots, f_{nL}]^T$ denotes the BoW representation for visual document $x_n$, the consistency can be defined by the following formula:

$$\text{Cons}(r, K) = \Sigma_n (\Sigma_i q_i f_{ni} + \Sigma_{i,j} c_{ij} f_{ni} f_{nj}) r_n \quad (7)$$

where r is the reranked score for the visual document, K is mined knowledge including the salient pattern values q and the concurrent pattern values c, as described above. Furthermore if $s=[s_1, s_2, \ldots, s_N]^T$ denotes a vector with entries $s_n=\Sigma_i q_i f_{ni}+\Sigma_{i,j} c_{ij} f_{ni} f_{nj}$, then s can be viewed as the cosine similarity between the visual representation of visual document $x_n$ and the mined visual patterns. Based on the two types of ranking distances, implementations herein integrate the above two ranking distances in equation (5) and (6), as well as consistency in equation (7) to equation (1), and have the following two objective reranking functions (i.e., pointwise and pairwise).

The reranking function using pointwise ranking distance can be expressed as follows:

$$\min_r \sum_n (r_n - \bar{r}_n)^2 - \lambda \sum_n \left( \sum_i q_i f_{ni} + \sum_{i,j} c_{ij} f_{ni} f_{nj} \right) r_n \quad (8)$$

This optimization problem can be referred to as "pointwise mining-based reranking." With the constraint $r_N=0$, the solution of Eq. (8) can be simplified as follows:

$$r = \frac{1}{2}(2\bar{r} + \lambda \check{s}) - \bar{r}_N e \quad (9)$$

where š is obtained by replacing the last element of s with zero, e is a vector with all elements being 1. Eq. (9) consists of two parts, i.e., r̄ and š, which corresponds to the initial ranked list as well as the learned knowledge, respectively. Therefore, the pointwise reranking can be also viewed as the linear fusion between the initial ranked list and the ranked list learned from the online sources.

Furthermore the reranking function using pairwise ranking distance may be expressed as:

$$\min_r \sum_{m,n} \left(1 - \frac{r_m - r_n}{\bar{r}_m - \bar{r}_n}\right)^2 - \lambda \sum_n \left( \sum_i q_i f_{ni} + \sum_{i,j} c_{ij} f_{ni} f_{nj} \right) r_n \quad (10)$$

This optimization problem can be referred to as "pairwise mining-based reranking." The solution of Eq. (10) with a constraint $r_N=0$ can be simplified as follows:

$$r = \frac{1}{2} \check{\Delta}^{-1}(2\check{c} + \lambda \check{s}) \quad (11)$$

where $c=2 (Ue)^T$, $\check{\Delta}$ and $\check{c}$ are obtained by replacing the last row of $\Delta$ with $[0, 0, \ldots, 0, 1]_{1\times N}$ and last element of c with zero, respectively, $\Delta=D-U$, where $U=[u_{mn}]_{N\times N}$ denotes an anti-symmetric matrix with $$u_{mn} = \frac{1}{\bar{r}_m - \bar{r}_n},$$

and D is a diagonal matrix with its (n-n)-element $d_{nn}=\Sigma_{m=1}^N u_{nm}$. In Eq. (10), there are also two parts, i.e., $\check{\Delta}^{-1}\check{c}$ and $\check{\Delta}^{-1}\check{s}$, in which $\check{\Delta}^{-1}\check{c}$ is solely determined by the initial rank of the visual document in the initial ranked list, while $\check{\Delta}^{-1}\check{s}$ can be viewed as the learned knowledge biased by the initial ranked list. Therefore, the reranked list can be also viewed as the combination of the initial ranked list and the learned knowledge.

Exemplary Process

Figure 11:
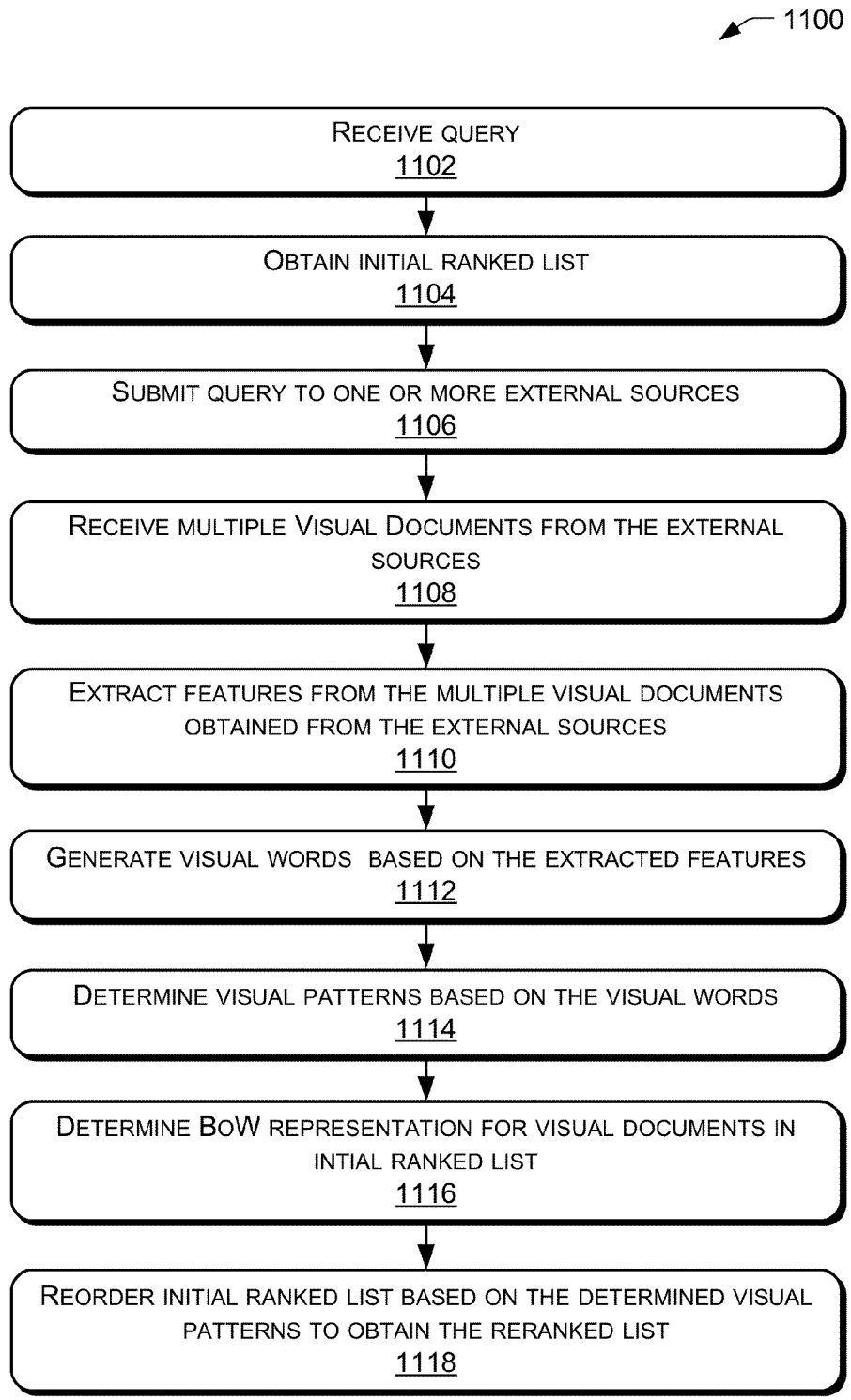
FIG. 11 illustrates a flowchart of an exemplary process for reranking visual search content according to some implementations.

FIG. 11 illustrates a flowchart of an exemplary process for visual search reranking based on results obtained from one or more external sources. The process may be carried out by a processor of a computing device, such as a server, executing computer program code stored as computer-readable instructions on a computer-readable storage media or the like.

At block 1102, a query is received for carrying out a search to obtain visual content relevant to the query.

At block 1104, an initial ranked list of results is obtained in response to the query. For example, the results may include a plurality of visual documents ranked according to any number of conventional text-based ranking algorithms.

At block 1106, the query is also submitted to one or more external sources such as search engines, databases having visual content, or the like. For example, as discussed above, there are a number of search engines (e.g., Google®, Yahoo!®, and Bing™) and social media sites or other sites with visual content databases (e.g., Flickr®, Wikipedia®, etc.) supporting different kinds of visual search abilities to provide a rich crowd-sourcing knowledge base available on the Internet that can be used for reranking of visual search results. In some implementations, the query is submitted to a plurality of external sources to obtain a good-sized sample of various different ranked results obtained from various different search engines, visual databases and other sources. This enables the application of a crowd-based reranking technique that applies the premise that the information obtained from a large number of different sources will average out to be more accurate than information obtained from a single source.

At block 1108, results are received from the one or more external sources, typically in the form of ranked results that include associated visual documents or visual content corresponding to the query.

At block 1110, visual features are extracted from the multiple visual documents obtained from the external sources using one or more feature extraction techniques such as color histograms, SIFT feature extraction, or other known feature extraction techniques.

At block 1112, a plurality of visual words is generated based on the extracted features. As described above, each visual word includes a plurality of similar feature patches extracted from the multiple visual documents.

At block 1114, common visual patterns are determined based on the visual words and the connections between the visual words. For example, as described above, a salient pattern is determined and also concurrent patterns are determined for the visual words.

At block 1116, a visual word representation of each of the visual documents in the initial ranked list is determined, such that each visual document in the initial ranked list is represented by the concurrencies of a group of the visual words.

At block 1118, the initial ranked list is reordered based at least in part on the determined visual patterns to obtain the reranked list. For example, as discussed above, the recurring visual patterns determined based on the visual words are applied to the initial ranked list using one or more techniques such as by calculating a pointwise ranking distance or a pairwise ranking distance. Both the pointwise ranking technique and the pairwise ranking technique have been found to produce satisfactory results. New ranking values are determined for the visual documents associated with the initial ranked list using the mined visual patterns, and these ranking values may also be based in part upon the initial ranking of the visual documents in the initial ranked list. Thus, implementations herein also take into account the rankings based on the initial text-based results as well as the results based on the analysis of the visual documents received from external sources. Additionally, it should be noted that as a practical matter, in some implementations only the higher ranked visual documents are reranked. For example, only the top 5, top 10, top 50, etc., visual documents in the initial ranked list might be reranked to provide a quicker processing time for returning results in response to the query.

Server Computing Device

Figure 12:
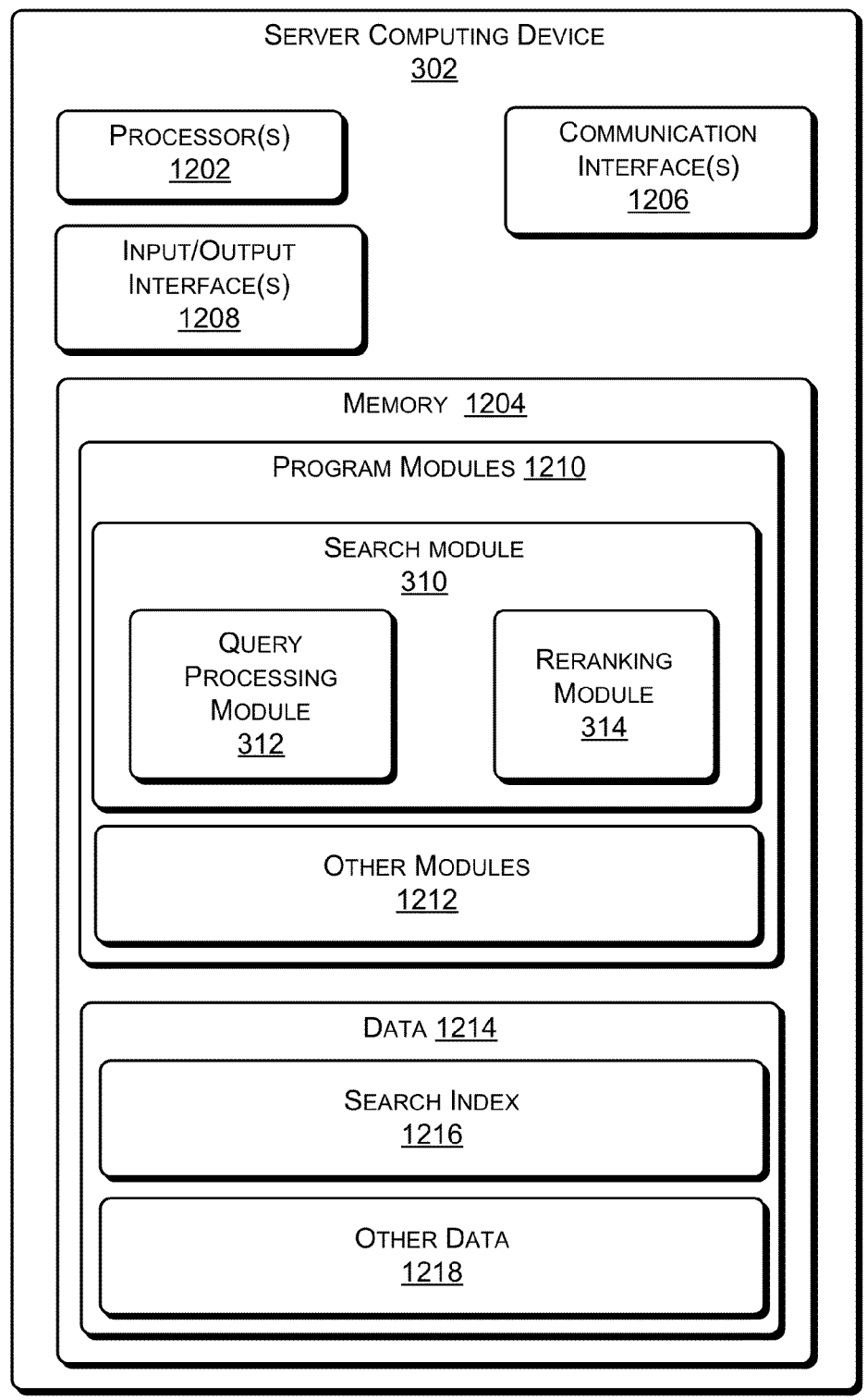
FIG. 12 illustrates an exemplary server computing device according to some implementations.

FIG. 12 illustrates an exemplary server computing device 302 on which visual search reranking can be implemented. It is to be appreciated, that implementations of the reranking may also or alternatively be performed on other computing devices, such as client computing devices 304 through incorporation of the reranking module 314 described herein in those devices. In the illustrated example, server computing device 302 includes one or more processors 1202 coupled to a memory 1204, one or more communication interfaces 1206, and one or more input/output interfaces 1208. The processor(s) 1202 can be a single processing unit or a number of processing units, all of which could include multiple computing units or multiple cores. The processor(s) 1202 may be implemented as one or more microprocessors, microcomputers, microcontrollers, digital signal processors, central processing units, state machines, logic circuitries, and/or any devices that manipulate signals based on operational instructions. Among other capabilities, the processor(s) 1202 can be configured to fetch and execute computer-readable instructions stored in the memory 1204 or other computer readable storage medium.

The memory 1204 can include any computer-readable storage media known in the art including, for example, volatile memory (e.g., RAM) and/or non-volatile memory (e.g., flash, etc.), mass storage devices, such as hard disk drives, solid state drives, removable media, including external drives, removable drives, floppy disks, optical disks, or the like, or any combination thereof. The memory 1204 stores computer-readable processor-executable program instructions as computer program code that can be executed by the processor(s) 1202 as a particular machine for carrying out the methods and functions described in the implementations herein.

The communication interface(s) 1206 facilitate communication between the server computing device 302 and the client computing devices 304 and/or external computing devices 320. Furthermore, the communication interface(s) 1206 may include one or more ports for connecting a number of client-computing devices 304 to the server computing device 302. The communication interface(s) 1206 can facilitate communications within a wide variety of networks and protocol types, including wired networks (e.g., LAN, cable, etc.) and wireless networks (e.g., WLAN, cellular, satellite, etc.), the Internet and the like. In one implementation, the server computing device 302 can receive an input visual search query from a user or client device via the communication interface(s) 1206, and the server computing device 302 can send back the retrieved relevant information back to the client computing device 304 via the communication interface(s) 1206.

Memory 1204 includes a plurality of program modules 1210 stored therein and executable by processor(s) 1202 for carrying out implementations herein. Program modules 1210 include the search module 310 including the query processing module 312 and the reranking module 314, as discussed above. Memory 1204 may also include other modules 1212, such as an operating system, communication software, drivers, a search engine or the like.

Memory 1204 also includes data 1214 that may include a search index 1216 and other data 1218. In some implementations, server computing device 302 receives a visual search query from a user or an application, and processor(s) 1202 executes the visual search query using the query processing module 312 to access the search index 1216 to retrieve relevant visual search results which are then compiled into the initial ranked list. Further, while exemplary system architectures have been described, it will be appreciated that other implementations are not limited to the particular system architectures described herein.

Other Exemplary Computing Implementations

Search module 310 described above can be employed in many different environments and situations for conducting visual content searching and reranking. Generally, any of the functions described with reference to the figures can be implemented using software, hardware (e.g., fixed logic circuitry), manual processing, or a combination of these implementations. The term "logic", "module" or "functionality" as used herein generally represents software, hardware, or a combination of software and hardware that can be configured to implement prescribed functions. For instance, in the case of a software implementation, the term "logic," "module," or "functionality" can represent program code (and/or declarative-type instructions) that performs specified tasks when executed on a processing device or devices (e.g., CPUs or processors). The program code can be stored in one or more computer readable memory devices or other computer readable storage devices. Thus, the methods and modules described herein may be implemented by a computer program product. The computer program product may include computer-readable media having a computer-readable program code embodied therein. The computer-readable program code may be adapted to be executed by one or more processors to implement the methods and/or modules of the implementations described herein. The terms "computer-readable storage media", "processor-accessible storage media", or the like, refer to any kind of machine storage medium for retaining information, including the various kinds of storage devices discussed above.

FIG. 13 illustrates an exemplary configuration of computing device implementation 1300 that can be used to implement the devices or modules described herein, such as any of server computing device 302, client computing devices 304, and/or external computing devices 320. The computing device 1300 may include one or more processors 1302, a memory 1304, communication interfaces 1306, a display 1308, other input/output (I/O) devices 1310, and one or more mass storage devices 1312 in communication via a system bus 1314. Memory 1304 and mass storage 1312 are examples of the computer-readable storage media described above for storing instructions which are executed by the processor(s) 1302 to perform the various functions described above. For example, memory 1304 may generally include both volatile memory and non-volatile memory (e.g., RAM, ROM, or the like). Further, mass storage media 1306 may generally include hard disk drives, solid-state drives, removable media, including external and removable drives, memory cards, Flash memory, floppy disks, optical disks, or the like. Both memory 1304 and mass storage 1312 may be collectively referred to as memory or computer-readable media herein.

The computing device 1300 can also include one or more communication interfaces 1306 for exchanging data with other devices, such as via a network, direct connection, or the like, as discussed above. A display 1308 may be included as a specific output device for displaying information, such as for displaying results of the visual searches described herein, including the reranked list of visual search results. Other I/O devices 1310 may be devices that receive various inputs from the user and provide various outputs to the user, and can include a keyboard, a mouse, printer, audio input/output devices, and so forth.

The computing device 1300 described herein is only one example of a computing environment and is not intended to suggest any limitation as to the scope of use or functionality of the computer and network architectures that can implement visual search reranking Neither should the computing device 1300 be interpreted as having any dependency or requirement relating to any one or combination of components illustrated in the computing device implementation 1300. In some implementations, computing device 1300 can be, for example, server computing device 302, client computing device 304, and/or external computing devices 320.

In addition, implementations herein are not necessarily limited to any particular programming language. It will be appreciated that a variety of programming languages may be used to implement the teachings described herein. Further, it should be noted that the system configurations illustrated in FIGS. 1, 3, 4, 12 and 13 are purely exemplary of systems in which the implementations may be provided, and the implementations are not limited to the particular hardware configurations illustrated.

It may be seen that this detailed description provides various exemplary implementations, as described and as illustrated in the drawings. This disclosure is not limited to the implementations described and illustrated herein, but can extend to other implementations, as would be known or as would become known to those skilled in the art. Reference in the specification to "one implementation", "this implementation", "these implementations" or "some implementations" means that a particular feature, structure, or characteristic described in connection with the implementations is included in at least one implementation, and the appearances of these phrases in various places in the specification are not necessarily all referring to the same implementation. Additionally, in the description, numerous specific details are set forth in order to provide a thorough disclosure. However, it will be apparent to one of ordinary skill in the art that these specific details may not all be needed in all implementations. In other circumstances, well-known structures, materials, circuits, processes and interfaces have not been described in detail, and/or illustrated in block diagram form, so as to not unnecessarily obscure the disclosure.

CONCLUSION

Implementations described herein provide for reranking of visual search results to improve relevancy. Using search results obtained from different external sources can complement the relevant visual information from each source. Thus, the reranking performance can be significantly improved due to the richer knowledge obtained from multiple sources, without relying entirely on visual pattern detection. Accordingly, implementations herein are characterized by mining relevant visual patterns from the search results of multiple external sources, and finding the representative visual patterns, as well as their relative strengths and relations in multiple sets of visual documents. The mined visual patterns can then be used to reorder an initial ranked list to improve the relevancy of the results by ranking results determined to be more relevant more highly in the reranked list.

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims Additionally, those of ordinary skill in the art appreciate that any arrangement that is calculated to achieve the same purpose may be substituted for the specific implementations disclosed. This disclosure is intended to cover any and all adaptations or variations of the disclosed implementations, and it is to be understood that the terms used in the following claims should not be construed to limit this patent to the specific implementations disclosed in the specification. Instead, the scope of this patent is to be determined entirely by the following claims, along with the full range of equivalents to which such claims are entitled.

The invention claimed is:

1. A method implemented on a computing device, the method comprising:
   receiving a query for visual content;
   obtaining an initial ranked list of results in response to the query, the initial ranked list corresponding to a first plurality of images;
   obtaining additional results in response to the query from one or more external sources, the additional results including a second plurality of images;
   extracting, by a processor of the computing device, features from the second plurality of images obtained from the one or more external sources to generate a plurality of visual words, wherein each visual word includes a plurality of similar feature patches extracted from the second plurality of images;
   determining recurring visual patterns based on the visual words and connections between the visual words;
   determining a visual word representation of each of the first plurality of images corresponding to the initial ranked list;
   reordering, by the processor, the initial ranked list based at least in part on a comparison of the determined recurring visual patterns with the visual word representations of the first plurality of images to generate a reranked list.

2. The method according to claim 1, wherein the determining recurring visual patterns based on the visual words and connections between the visual words further comprises determining a salient pattern based on a number of extracted patches contained in each visual word.

3. The method according to claim 2, wherein the determining visual patterns based on the visual words and connections between the visual words further comprises
   determining a concurrent pattern based on a number of connections between the visual words,
   wherein there is a connection between first and second visual words when the first visual word contains a first patch and the second visual word contains a second patch, and the first patch and the second patch were extracted from a same image of the plurality of second images.

4. The method according to claim 3, wherein the reordering the initial ranked list based at least in part on the determined visual patterns to generate a reranked list further comprises:
   applying the determined visual patterns to the visual word representation of each of the first plurality of images using one of a pointwise ranking or a pairwise ranking.

5. The method according to claim 1, wherein the features are extracted for generating the visual words using one of:
   color histograms; or
   scale invariant feature transforms.

6. The method according to claim 1, wherein an initial ranking of the first plurality of images in the initial ranked list is also taken into consideration when reordering the initial ranked list, wherein the initial ranking is based at least in part upon text-based rankings.

7. A method comprising:
obtaining a ranked list of a first plurality of images from a first source in response to a query;
obtaining a second plurality of images relevant to the query from a plurality of second sources;
comparing, by a processor, visual patterns identified from the second plurality of images with the first plurality of images; and
reranking the first plurality of images based on the comparing of the visual patterns from the second plurality of images with the first plurality of images.

8. The method according to claim 7, wherein comparing the visual patterns identified from the second plurality of images further comprises:
extracting features from the second plurality of images to generate a plurality of visual words, wherein each visual word includes a plurality of similar feature patches extracted from the second plurality of images.

9. The method according to claim 8, further comprising determining recurring visual patterns based on the visual words and connections between the visual words for determining a salient pattern and a concurrent pattern among the visual words.

10. The method according to claim 9, further comprising determining a visual word representation of each of the first plurality of images.

11. The method according to claim 10, wherein reranking the first plurality of images based on the comparing of the visual patterns from the second plurality of images with the first plurality of images further comprises applying the determined salient pattern and concurrent pattern to each of the first plurality of images using one of a pointwise ranking or a pairwise ranking.

12. The method according to claim 7,
wherein the ranked list is initially ranked according to an initial ranking based on relevancy of the first plurality of images to the query,
wherein the ranking of the ranked list is also taken into consideration when reranking the first plurality of images
wherein the ranking of the ranked list is based at least in part upon text-based rankings.

13. The method according to claim 7,
wherein a first server computing device obtains the ranked list in response to a query received from a client computing device,
wherein the first server computing device obtains the second plurality of images from a plurality of second server computing devices in communication with the first server computing device over the Internet,
wherein the first server computing device and the plurality of second server computing devices each provide at least one of a visual content search engine or a visual content database.

14. One or more computer-readable storage devices comprising processor-executable instructions adapted to be executed by a processor for carrying out the method according to claim 7.

15. A computing device comprising:
a processor coupled to a computer-readable storage device including instructions executable by the processor to implement:
a query processing module for obtaining a ranked list of a plurality of first visual content documents in response to a query; and
a reranking module that submits the query to one or more external sources for obtaining a plurality of second visual content documents, wherein the reranking module examines the second visual content documents to extract features from the second visual content documents and reorders the ranked list based on a similarity with the extracted features.

16. The computing device according to claim 15,
wherein the reranking module submits the query to a plurality of server computing devices in communication with the computing device through the Internet as the one or more external sources, wherein each of the server computing devices provides access to at least one of a visual content database or visual content search engine.

17. The computing device according to claim 15, wherein the reranking module identifies features from the plurality of second visual content documents to generate a plurality of visual words, wherein each visual word includes a plurality of image patches having similar visual features extracted from the plurality of second visual content documents.

18. The computing device according to claim 17, wherein the reranking module identifies recurring visual patterns based on the visual words and connections between the visual words for determining a salient pattern and a concurrent pattern among the visual words.

19. The computing device according to claim 15, wherein the reranking module reorders the plurality of first visual content documents by applying the determined salient pattern and concurrent pattern to each of the plurality of first visual content documents using one of a pointwise ranking or a pairwise ranking.

20. The computing device according to claim 15, wherein the computing device is a client computing device having a web browser that comprises the query processing module and the reranking module.

* * * * *